United States Patent
Agombar et al.

(10) Patent No.: US 10,635,344 B2
(45) Date of Patent: Apr. 28, 2020

(54) DYNAMIC SPARE STORAGE ALLOCATION BY CREATING LOGICAL VOLUMES FROM UNUSED SPACE ALLOCATED FOR USER DATA OF A RAID STORAGE

(71) Applicant: International Business Machines Corporation, Armonk, NY (US)

(72) Inventors: John P. Agombar, Winchester (GB); Ian Boden, Southampton (GB); Gordon D. Hutchison, Eastleigh (GB); Lee J. Sanders, Chichester (GB)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 15/139,374

(22) Filed: Apr. 27, 2016

(65) Prior Publication Data
US 2017/0315745 A1   Nov. 2, 2017

(51) Int. Cl.
G06F 3/06   (2006.01)

(52) U.S. Cl.
CPC .......... *G06F 3/0653* (2013.01); *G06F 3/0608* (2013.01); *G06F 3/0631* (2013.01); *G06F 3/0689* (2013.01)

(58) Field of Classification Search
CPC combination set(s) only.
See application file for complete search history.

(56) References Cited

U.S. PATENT DOCUMENTS

| | | | |
|---|---|---|---|
| 5,651,133 A * | 7/1997 | Burkes | G06F 11/1076 711/114 |
| 7,111,117 B2 | 9/2006 | Franklin et al. | |
| 7,886,111 B2 | 2/2011 | Klemm et al. | |
| 7,949,847 B2 | 5/2011 | Murase | |
| 8,099,623 B1 * | 1/2012 | Li | G06F 11/1084 714/6.22 |
| 8,407,445 B1 * | 3/2013 | Pathak | G06F 3/0608 711/114 |
| 8,943,359 B2 | 1/2015 | Tiwari et al. | |
| 9,043,639 B2 | 5/2015 | Barrall et al. | |
| 10,082,959 B1 * | 9/2018 | Chen | G06F 3/0608 |
| 2002/0053090 A1 * | 5/2002 | Okayama | H04N 7/163 725/152 |
| 2004/0236986 A1 * | 11/2004 | Ng | G06F 11/1662 714/6.22 |

(Continued)

OTHER PUBLICATIONS

RAID 6. Article [online]. Intel, 2005 [retrieved on Jun. 13, 2019]. Retrieved from the Internet: . (Year: 2005).*

(Continued)

*Primary Examiner* — Ann J Lo
*Assistant Examiner* — Chie Yew
(74) *Attorney, Agent, or Firm* — Stosch Sabo

(57) ABSTRACT

A storage drive array with available storage space for user data with storage capacity in the array allocated to distributed spare space. The distributed spare space spreads portions of a spare drive across multiple storage drives in the array. By monitoring the amount of spare space available in the array, a determination may be whether the amount of spare space falls below a threshold number of drives. If there is un-used space in the available storage space which is greater than one drive of space, a drive of space to spare space may be dynamically re-allocated in a distributed pattern across the drives of the array.

13 Claims, 8 Drawing Sheets

(56) References Cited

U.S. PATENT DOCUMENTS

| | | | | |
|---|---|---|---|---|
| 2005/0108475 A1* | 5/2005 | Yamamoto | ............ | G06F 11/1076 711/114 |
| 2005/0235128 A1* | 10/2005 | Rustagi | ................. | G06F 3/0605 711/170 |
| 2006/0143426 A1* | 6/2006 | Wu | ........................ | G06F 3/0616 711/203 |
| 2007/0016746 A1* | 1/2007 | Kano | ..................... | G06F 3/0608 711/165 |
| 2007/0143563 A1* | 6/2007 | Pudipeddi | .............. | G06F 3/0607 711/173 |
| 2009/0240882 A1* | 9/2009 | Shiga | ..................... | G06F 3/0607 711/114 |
| 2010/0191908 A1* | 7/2010 | Yamakawa | ............ | G06F 3/0605 711/114 |
| 2014/0089581 A1* | 3/2014 | DeNeui | ................. | G06F 3/0607 711/114 |
| 2014/0215590 A1* | 7/2014 | Brand | ................. | H04L 67/1097 726/6 |
| 2015/0120859 A1* | 4/2015 | Kondo | ................. | G06F 12/0868 709/213 |
| 2017/0220282 A1* | 8/2017 | Dambal | ................. | G06F 3/0631 |

OTHER PUBLICATIONS

Mell et al., "The NIST Definition of Cloud Computing", Recommendations of the National Institute of Standards and Technology, NIST, U.S. Department of Commerce, Special Publication 800-145, Sep. 2011, 7 pages.

Agombar et al., "Storage Capacity Allocation Using Distributed Spare Space", U.S. Appl. No. 15/070,029, filed Mar. 15, 2016.

\* cited by examiner

FIG. 5

STORAGE CONTROLLER 500

PROCESSOR 501

MEMORY 502
COMP. INST. 503

SPARE DRIVE ALLOCATION SYSTEM 510

CONFIGURATION COMPONENT 511

SPARE CAPACITY MONITORING COMPONENT 512

SPARE THRESHOLD COMPONENT 513

UN-USED SPACE DETERMINING COMPONENT 514

PHYSICAL DRIVE REPLACEMENT PROMPT COMPONENT 515

RE-ALLOCATION COMPONENT 520

AREA SELECTION COMPONENT 521

MIGRATION COMPONENT 524

ARRAY COMM. COMPONENT 522

MAPPING COMPONENT 523

MAPPING DATA STRUCTURE 525 ic # DYNAMIC SPARE STORAGE ALLOCATION BY CREATING LOGICAL VOLUMES FROM UNUSED SPACE ALLOCATED FOR USER DATA OF A RAID STORAGE

BACKGROUND

The present invention relates to spare storage allocation in storage arrays, and more specifically to dynamic unused storage reallocation as distributed spare storage.

RAID (Redundant Array of Independent Disks) arrays are known to have physical spares in the form of real disk drives that can be substituted into an array when a member of the array fails. If a RAID array is to be provided with maximum robustness, particularly in a setup where the number of physical drive maintenance sessions by a maintenance engineer is minimized, many spare drives may be provided in order to cover for multiple failures and a longer period of lights-off operation.

Raid arrays are usually set up with a fixed number of spares. Sending an engineer to change a drive is expensive so it is common to 'batch' up drive replacements. To enable this to be done it is advantageous to have multiple spare drives but if it turns out there are few failures all this space is wasted.

In distributed sparing, instead of a dedicated spare drive, a portion of each of the member drives is allocated to act as a logical spare area that, when combined together, acts as the equivalent of a spare drive. For example, if there is an array of N drives, then if each drive sets aside 1/Nth of its space towards a distributed spare, then when a drive fails, all remaining drives take part in the drive rebuild. With distributed spares there is the flexibility to minimize maintenance sessions, as spares are a logical configuration or geometry issue and not tied tightly to idle physical drives.

SUMMARY

Disclosed herein are embodiments of a method, computer program product, and computer system for dynamically allocating spare storage.

The method for dynamic spare storage allocation may be implemented on a computer providing a storage drive array with available storage space for user data. The storage capacity in the array is allocated to distributed spare space, which spreads portions of each spare drive across multiple storage drives in the array. The amount of spare space available in the array is monitored so that so that it may be determined when the amount of spare space falls below a threshold number of drives. Un-used space in the available storage space is assessed to determine whether there is greater than one drive of un-used space available. A drive of un-used space is dynamically re-allocated to spare space in a distributed pattern across the drives of the array.

The system for dynamic spare storage allocation uses a storage controller having a processor and a memory configured to provide computer program instructions to the processor. A configuration component provides a storage drive array with available storage space for user data and allocates storage capacity in the array to distributed spare space. A spare capacity monitoring component monitors the amount of spare space available in the array and a spare threshold component determines if the amount of spare space falls below a threshold number of drives. An un-used space determining component determines if there is un-used space in the available storage space which is greater than one drive of space. A re-allocating component dynamically re-allocates a drive of un-used space to spare space in a distributed pattern across the drives of the array.

The computer program product for dynamic spare storage allocation may be a computer readable storage medium containing program instructions executable by a processor. In response the processor may provide a storage drive array with available storage space for user data. The processor can allocate storage capacity in the array to distributed spare space, and monitor the amount of spare space available in an array to determine if the amount falls below a threshold number of drives of spare space. The processor may also determine if there is greater than one drive of un-used space in the available storage space which may be dynamically re-allocated to spare space in a distributed pattern across the drives of the array.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts a block diagram of an example embodiment of a system in accordance with the present disclosure.

Figure 1:
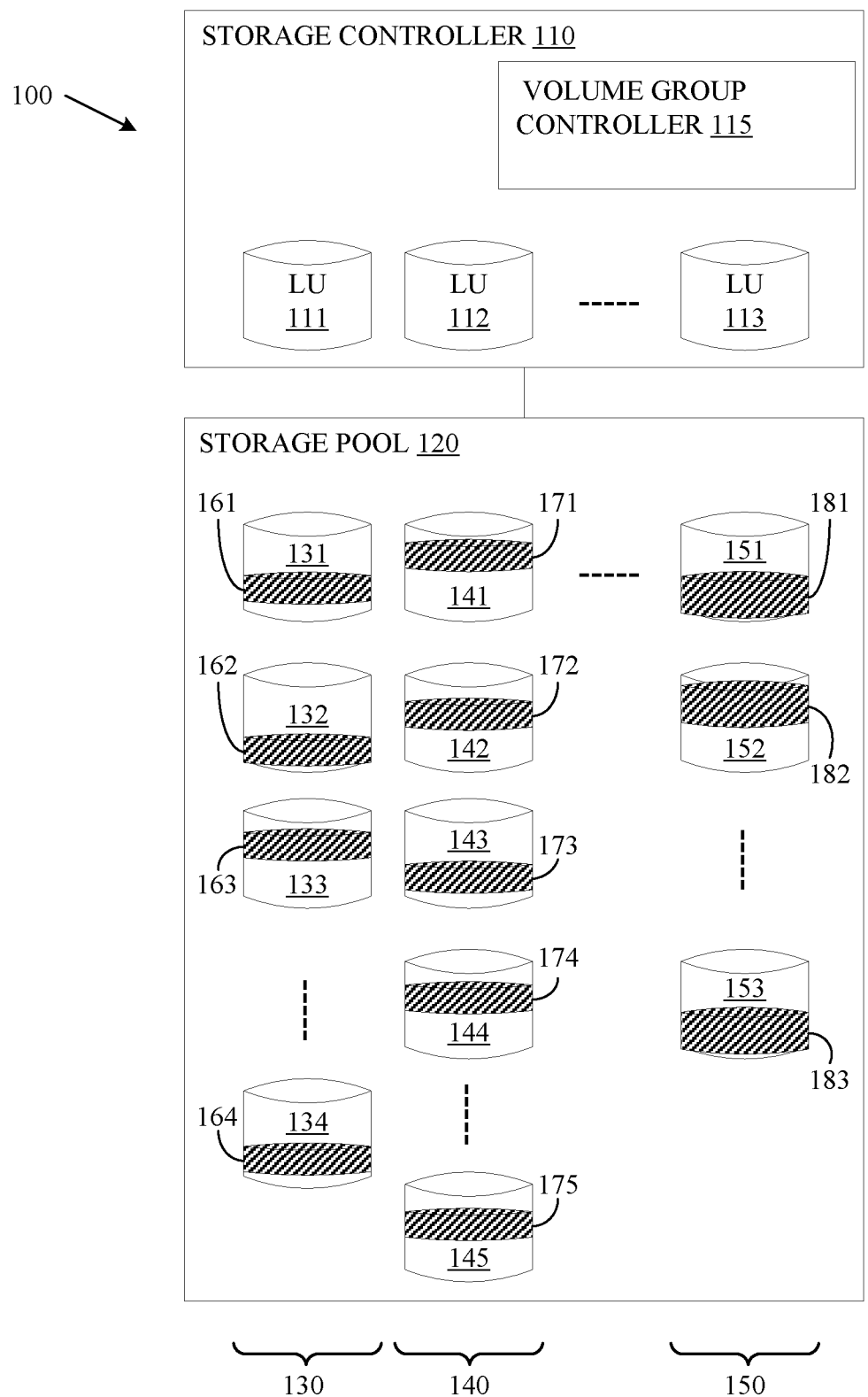
FIG. 1 depicts a schematic diagram of a storage system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The described method, system, and computer program product relate to dynamic provisioning of storage arrays in which a storage pool or subsystem is set up with arrays having an available data storage capacity and allocated space for distributed spares.

The more distributed spares an array has, the longer the array can continue to operate without physical maintenance, saving money, administrative staff, and time. However, each additional distributed spare decreases the size of the array. The use case for distributed spare space tends to be sudden, urgent, and chunked at a minimum of a whole drive.

With increased size of data centers, even with the statistical reliability of modern drives, the sheer number of drives mean that efficiently managing drive failure and replacement is a big part of the total cost-of-ownership in large and distributed systems.

Using the method described herein, if the array detects that the number of spare drives has gone below a threshold (for example, a threshold of two spare drives) then a determination is made whether the actual size of the array minus the used space is greater than the size of one drive. If so, the available space is shrunk by the size of one drive and any existing data in the space is migrated to unused blocks of the newly sized array. A migration of data is performed within the array to free up space across each of the members of the distributed array in a pattern that is consistent with a distributed spare.

Once any existing data has been migrated, the freed space may become the new distributed spare. The new distributed spare is then added into the data structures that describe the available spares. This allows continued access to the array data while maintaining the desired number of spare drives.

This technique is a means to make it safe to create a default protection level from, for example, two distributed spare drives per array, and to replenish this store of distributed spare drives dynamically from unused space in the storage pool that the array contributes to. Two is commonly chosen to allow for a second failure while a failed drive's data is being rebuilt onto a spare and as Raid 6 can only do this nested rebuild for two failures.

This is advantageous in that the array will keep going for as long as possible until there are not enough working drives to store the users' data in the array. Also, it has the advantage that users do not need to worry about how many spares to allocate to the arrays. They will always automatically have enough provisioned as required without having to over allocate them at initial array creation. The described technique avoids running out of spares.

It is to be understood that the aforementioned advantages are example advantages and should not be construed as limiting. Embodiments of the present disclosure can contain all, some, or none of the aforementioned advantages while remaining within the spirit and scope of the present disclosure.

This technique contrasts with existing products which do not pre-assign storage to usable capacity or to spare space and do not distinguish between unused capacity and spare space. The described method allows a storage subsystem that pre-assigns space to usable storage and to spare space, to reassign capacity from one to the other during operation.

Referring to FIG. 1, a storage system 100 is shown as an example system in which the described method may be implemented. The described method and system may be implemented in a variety of different storage system arrangements in which a pool of storage resources formed of multiple storage device arrays are used.

The storage system 100 may include a storage controller 110 and a storage pool 120. The storage controller 110 may be provided via a network such as a storage area network (SAN) and the storage pool 120 may be distributed across multiple systems, which may also be provided via a network. The storage controller 110 may provide storage functionality to multiple host devices.

The storage pool 120 may include multiple storage drive arrays 130, 140, 150 and each storage drive array 130, 140, 150 may be referenced by a logical unit number (LUN) 111, 112, 113 as used by the storage controller 110. Each storage drive array 130, 140, 150 may include multiple disk drives, 131-134, 141-145, 151-153.

A volume group component 115 manages mapping between space on the multiple storage arrays 130, 140, 150 and the LUNs (or volumes) 111, 112, 113 that are seen by any host systems connected to the storage controller 110. In the context of this disclosure, it is the component that is managing whether space on the distributed array is used or available. Used space is allocated to a volume that is mapped to a host. Available space is not allocated to any volume yet, but the storage administrator may choose to create new volumes or expand existing volumes, both of which would cause some of this available space to be allocated.

Distributed spare storage is a method in which a portion of each of the member drives is allocated to act as a logical spare area. When the logical spare areas of all the drives in an array are combined together, they act as the equivalent of a spare drive. For example, if there is an array of N drives, then if each drive sets aside 1/Nth of its space towards a distributed spare, then when a drive fails, all remaining drives take part in the drive rebuild. This is illustrated as spare areas 161-164 of the first array 130, spare areas 171-175 of the second array 140, and spare areas 181-183 of the third array 150. It should be noted that there may be multiple chunks of spare areas in a drive. The amount of spare space provided by distributed spares in an array may combine to equal one or more spare drives of space.

Figure 2:
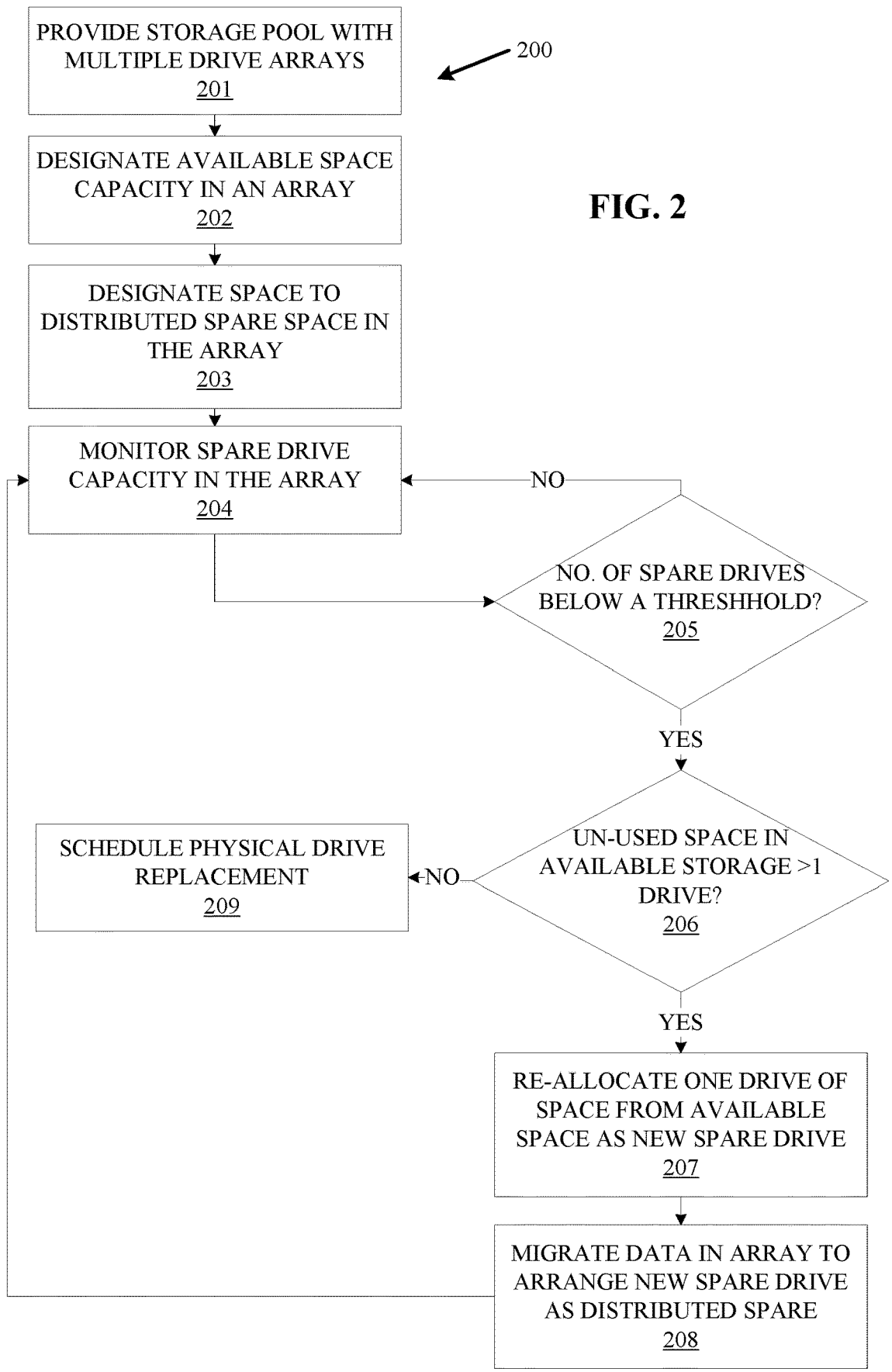
FIG. 2 depicts a flow diagram of an example embodiment of a method in accordance with the present disclosure.

As an example scenario, drive 133 of array 130 might fail. The storage controller 110 would reconstruct the data that was stored on this drive 133 and write it to the spare space 161,162, 164 in the other drives 131, 132, 134 of the array 130. Once it had done this operation there would be no spare space left in array 130 so it would attempt to perform the reallocation of unused space to create some new spare space. Referring to FIG. 2, a flow diagram 200 shows an example embodiment of the described method as carried out by a storage controller.

A storage pool is set up in the form of multiple storage drive arrays 201. Each array has an initial designated 202 size of available storage capacity. Each array additionally has a designated 203 space in the array which is allocated to distributed spares space.

Operation of the array is carried out with storage space from the available storage capacity used to store data. The method may monitor 204 the used storage capacity in the array.

A spare drive is used when a failure of one of the existing drives in the array occurs. The storage controller reconstructs the data that was being stored on the failed drive (for example, using parity data from the remaining drives in the array) and uses the spare drive to store this reconstructed data.

A threshold of a minimum number of spare drives in the array may be defined and it may be determined 205 if the threshold is reached during monitoring of the used storage capacity. If the threshold has not yet been reached, the monitoring 204 may continue.

If the minimum number of spare drives threshold is reached, it may be determined 206 if the un-used space in the array's available storage capacity is greater than the size of one drive. If the un-used space is less than the size of one drive, then data capacity is running low, and there is no redundancy available for the spare drives and therefore a physical drive replacement should be scheduled 209.

If the un-used space in the available storage capacity is greater than the size of one drive, re-allocation 207 may be carried out to allocate space from available space in the array as a new spare drive.

Optionally, data in the array may be migrated 208 to re-distribute the new spare drive in a pattern of a distributed spare drive across the array.

Monitoring 204 of the used spare drive capacity in the array may continue. The re-allocation of un-used space as spare drive may be carried out repeatedly until the minimum distributed spare space threshold for the array is reached.

FIGS. 3A to 3D are a series of schematic diagrams, which illustrate the method of the flow diagram 200 of FIG. 2.

Figure 3A:
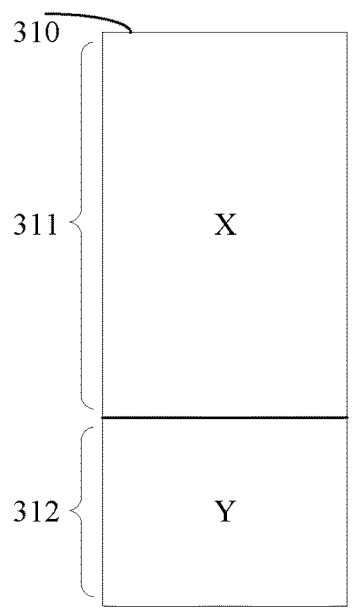
FIGS. 3A, 3B, 3C, and 3D depict schematic diagrams illustrating an example embodiment of an aspect of a method in accordance with the present disclosure.

In FIG. 3A, an array 310 is shown with a first portion 311 of the storage space designated as available storage capacity X and a second portion 312 of the storage space designated as distributed spare space Y. Together X and Y form the total storage space of the array 310.

Figure 3B:
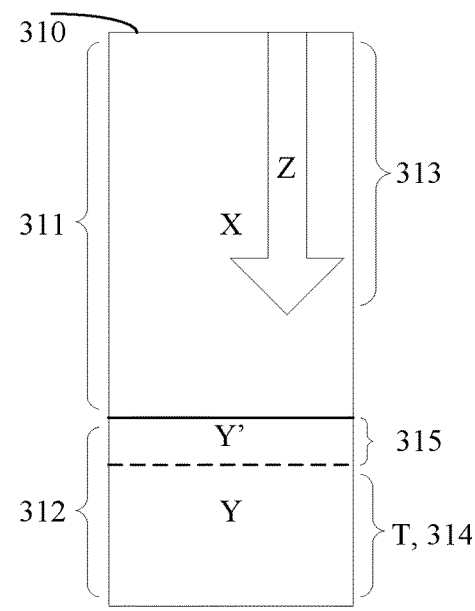

In FIG. 3B, the array 310 is used with available storage capacity X from the first portion 311 being used to store data Z as shown by the arrow 313. A threshold T 314 of a minimum amount of spare drive storage remaining is configured.

A drive failure causes the spare space Y' 315 to be used and this may cause a threshold T 314 of the minimum amount of spare drive storage remaining to be reached.

Figure 3C:
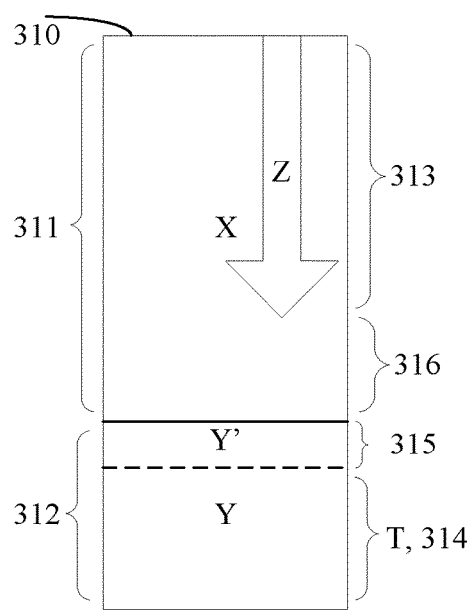

Referring to FIG. 3C, it may be determined if the amount of un-used space 316 in the array (X-Z) is greater than one drive of space.

Figure 3D:
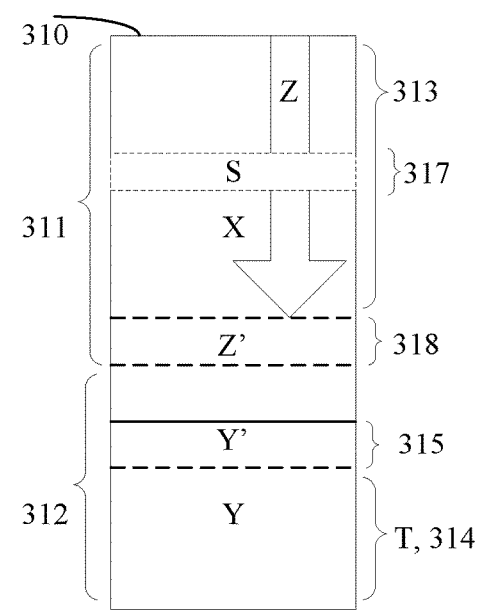

If so, referring to FIG. 3D, a size of space equal to a drive S 317 is re-allocated as a spare drive. This space may be re-distributed across the array in accordance with a distributed spare pattern. Some of the space X 311 now becomes unavailable as it is to be designated as new spare space S 317 and the data that was being stored there is migrated to available space Z' 318.

Figure 4:
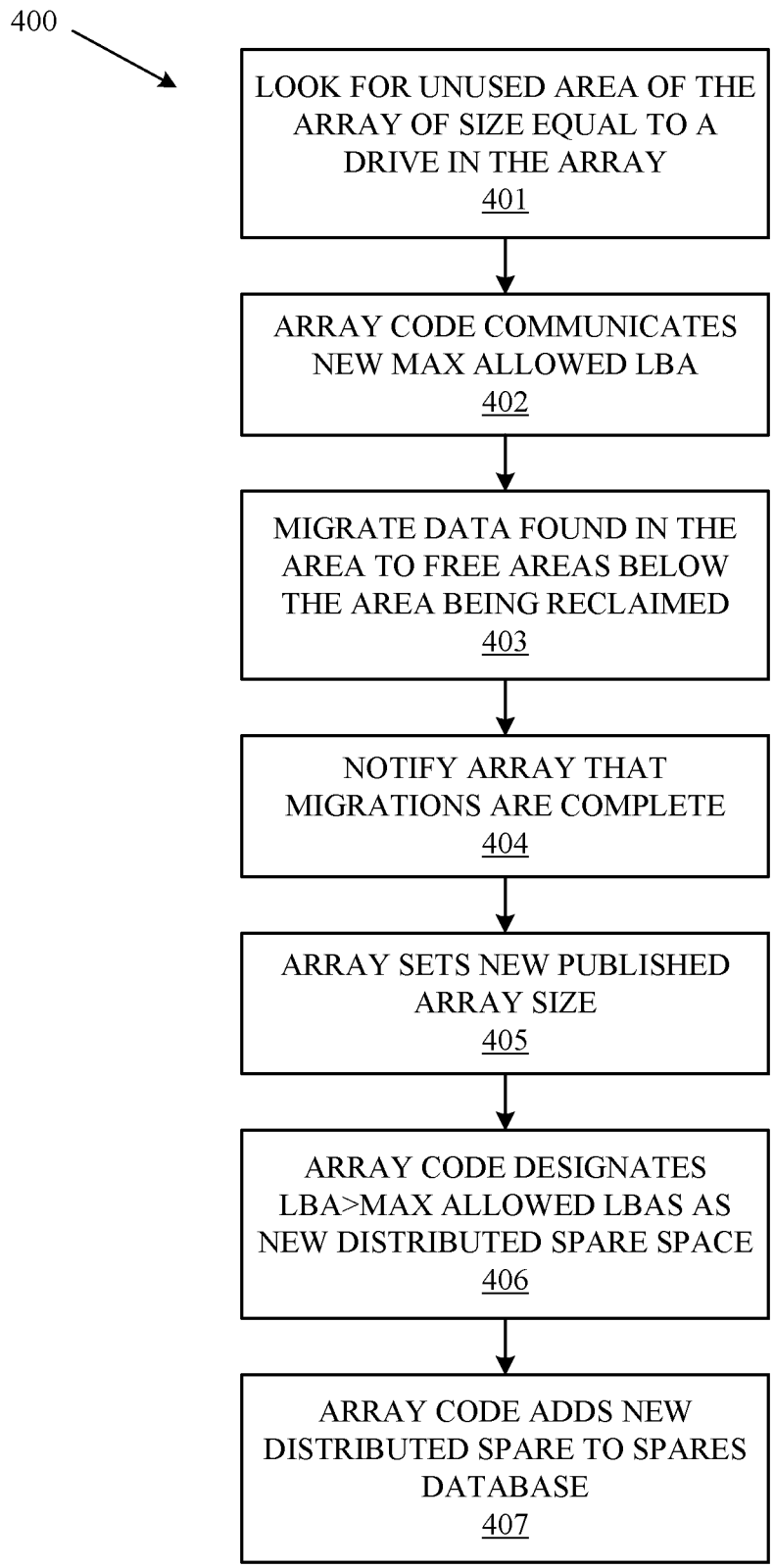
FIG. 4 depicts a flow diagram of an example embodiment of an aspect of the method of FIG. 2 in accordance with the present disclosure.

Referring to FIG. 4, a flow diagram 400 shows further details of an example embodiment of the aspect of the method of FIG. 2 of re-distributing the new spare drive of space in the array. The method may be carried out by a volume group component (e.g. volume group controller 115 from FIG. 1) that controls the mapping of users' volumes and an array code.

The volume group component may look 401 for an unused area of the array of a size equal to the size of a drive in the array. The array code may communicate 402 a new maximum allowed logical block address (LBA) for each drive of the previous maximum allowed LBA, less the size in LBAs of a drive divided by the number of drives.

All used space that the volume group controller finds in the areas of each drive, the data may be migrated 403 to unused space below the area being reclaimed.

Once the volume group controller has completed the migrations, it may notify 404 the array that the migrations are complete. The array code may set 405 a new published array size, less the size of the new spare drive. The array code may designate 406 LBAs greater than the new maximum allowed LBA as new horizontal distributed spare space distributed across all the remaining members of the array. The array code may add 407 the new distributed spare to the spares database.

In an example method described below, 'VG' is the volume group component that controls the mapping of users' volume data to physical space on the raid array logical drive.

1) The raid array code detects that the array has gone below the threshold of required distributed spares.

2) The raid array code queries the VG storage pool 'usedSpace' to see how much of the array space is actually used for user volumes.

3) If (sizeof(array)−sizeof(VgUsedSpace))>=sizeof (memberDrive), then a new distributed spare may be created with the following steps.

4) Instruct the VG to prepare for a shrinking of the array size by sizeof(memberDrive).

5) The VG may look for any used spaces that are allocated in the space that is intended to be reclaimed at the end of the array, this area is any space in the last (sizeof(member-Drive)/count(drives)) area of space in each drive. i.e. The raid array code communicates newMaxAllowedLBA=(old-MaxAllowedLBA−(sizeInLbas(memberDrive)/count (drives))) to VG.

6) For every allocated area that it finds in that area, VG migrates the data to free areas that are all below the area being reclaimed by the array.

7) Once VG has completed the migrations it notifies the array that the migrations (if any) are complete.

8) The raid array code sets the new publishedArraySize=publishedArraySize−sizeOf(member-Drive).

9) The raid array code designates LBAs>newMaxAllowedLBA as new distributed spare space.

The described method and system enable more advantageous automated storage setup. For example, a system may be provided that could operate for long periods of time without user intervention. This may be a low end, low maintenance product where each storage controller is configured with a default set of pools using all the drives plugged in to the system. This may be two pools per drive class (for mirroring) of maximum size possible with a default number of distributed spares (for example, two per array). It is likely that the initial pools could have a large proportion of headroom unused space as is typical of over provisioning of storage in most storage controller environments, particularly those that are not planned for very close management by dedicated staff.

Referring to FIG. 5, an example embodiment of a storage controller 500 is shown. The storage controller 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The storage controller 500 may include a spare drive allocation system 510 adapted for the functionality of the described method of spare drive storage allocation.

The spare drive allocation system 510 may include an array configuration component 511 for designating an initial available storage capacity in a multiple storage drive array and the storage capacity committed to distributed spare space. The distributed spare space spreads portions of a spare drive across storage drives in an array.

The spare drive allocation system 510 may include a spare capacity monitoring component 512 for monitoring an amount of spare capacity of the array. The storage allocation system 510 may include a spare threshold component 513 for determining when a threshold of a minimum number of spare drives is reached. The threshold of the minimum number of spare drives may be set in the configuration component 511.

The spare drive allocation system 510 may include an un-used space determining component 514 for determining the amount of un-used space in the available storage capacity and whether this is greater than the size of a drive. The spare drive allocation component 510 may also include a physical drive replacement prompt component 515 for prompting the physical drive replacement if the un-used space is less than a drive and the spare space is below the threshold of the minimum number of spare drives.

The spare drive allocation component 510 may include a re-allocation component 520 for re-allocating space from the available storage capacity as a spare drive. The re-allocation component 520 may include an area selection component 521 for selecting areas of drives in the array for re-allocation and a migration component 524 for migrating any data from the selected areas. The re-allocation component 520 may include an array communication component 522 for sending and receiving notifications to the array code regarding the new LBA limits. The re-allocation component 520 may also include a mapping component 523 for adding the mapping of the new distributed spare position to a mapping data structure 525.

Figure 6:
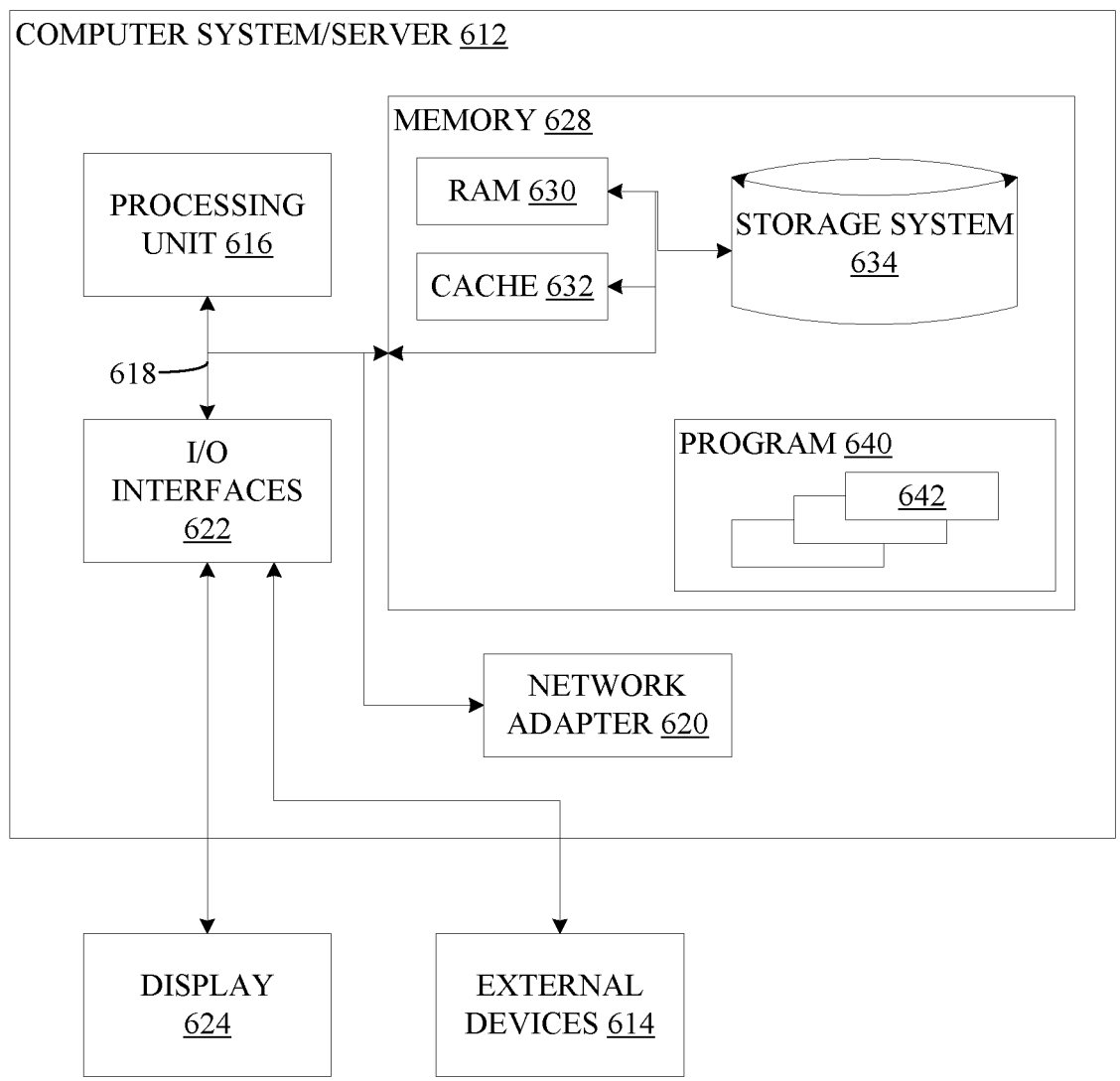
FIG. 6 depicts a block diagram of an embodiment of a computer system or cloud server in which aspects of the present disclosure may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
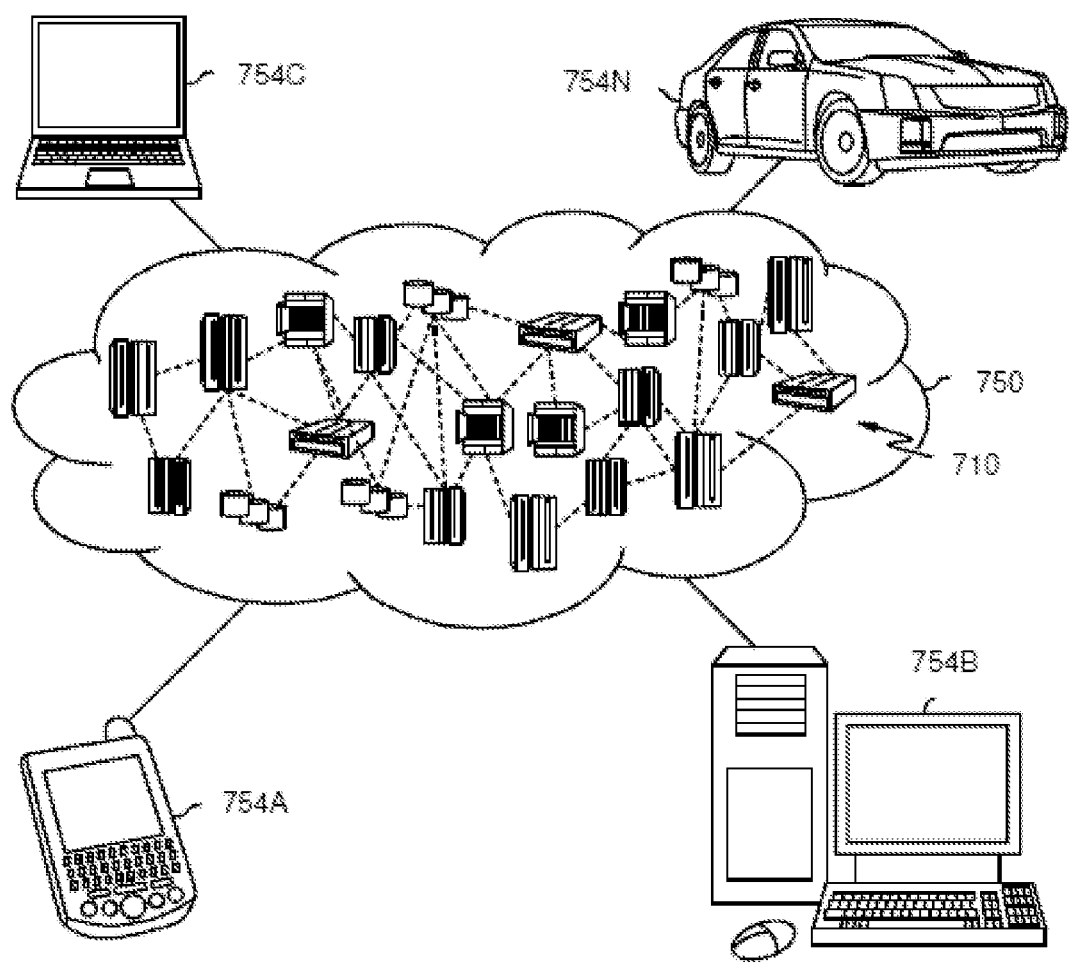
FIG. 7 depicts a schematic diagram of a cloud computing environment in which aspects of the present disclosure may be implemented.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
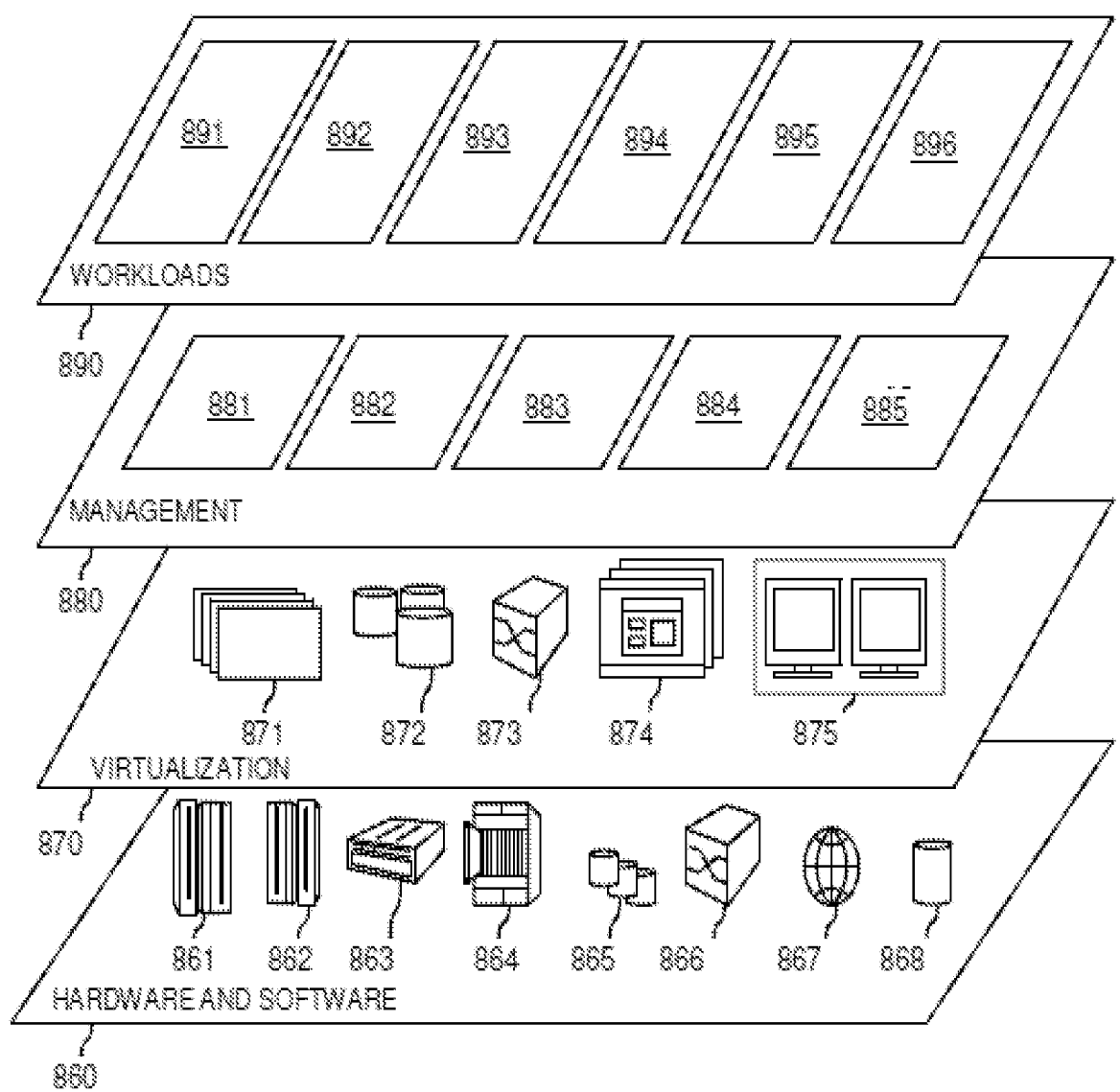
FIG. 8 depicts a diagram of abstraction model layers of a cloud computing environment in which aspects of the present disclosure may be implemented.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In some examples, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. As an example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and storage array control processing 896 including spare drive allocation.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for dynamic spare storage allocation, the computer program product comprising a computer readable storage medium having program instructions embodied therewith, the program instructions executable by a processor to cause the processor to:
    provide a storage array comprising a first redundant array of independent disks (RAID) 6 array, the first RAID 6 array having a first number of disk drives, each disk drive of the first number of disk drives having a storage space comprising:
        a first portion of used space storing user data;
        a second portion of unused space available for storing the user data; and
        a third portion of spare space providing redundancy to the first RAID 6 array;
    wherein a first cumulative amount of used space storing the user data in the first RAID 6 array includes each of the first portion of used space storing the user data of the first number of disk drives;
    wherein a second cumulative amount of unused space available for storing the user data in the first RAID 6 array includes each of the second portion of unused space available for storing the user data of the first number of disk drives;
    wherein a third cumulative amount of spare space providing redundancy to the first RAID 6 array in the first RAID 6 array includes each of the third portion of spare space providing redundancy to the first RAID 6 array of the first number of disk drives;
    determine that the third cumulative amount of spare space falls below two disk drives selected from the first number of disk drives;
    in response to determining that the third cumulative amount of spare space falls below the two disk drives selected from the first number of disk drives, determine that the second cumulative amount of unused space is greater than one disk drive selected from the first number of disk drives;
    in response to determining that the second cumulative amount of unused space is greater than the one disk drive selected from the first number of disk drives, migrating the user data within each of the first number of disk drives to re-allocate locations of the second portion of unused space in each of the first number of disk drives; and
    in response to migrating the user data, reduce each of the second portion of unused space available for storing the user data of the first number of disk drives by a first amount and increase each of the third portion of spare space providing redundancy to the first RAID 6 array of the first number of disk drives by the first amount, wherein the first amount is equal to the one disk drive selected from the first number of disk drives divided by the first number of disk drives.

2. The computer program product of claim 1, the program instructions further configured to cause the processor to:
    receive notification from the first RAID 6 array of a new maximum allowed logical block address in the form of the first RAID 6 array's previous maximum allowed logical block address less a size of the one disk drive selected from the first number of disk drives divided by the first number of disk drives.

3. The computer program product of claim 1, the program instructions further configured to cause the processor to:
    receive notification from the first RAID 6 array of a new array size in the form of the first RAID 6 array's previous size less a size of the one disk drive selected from the first number of disk drives divided by the first number of disk drives.

4. The computer program product of claim 1, the program instructions further configured to cause the processor to:
    receive notification from the first RAID 6 array of designated logical block addresses greater than a new maximum allowed logical block address being new spare space.

5. A method for dynamic spare storage allocation, the method comprising:
    providing a storage array comprising a first redundant array of independent disks (RAID) 6 array, the first RAID 6 array having a first number of disk drives, each disk drive of the first number of disk drives having a storage space comprising:
        a first portion of used space storing user data;
        a second portion of unused space available for storing the user data; and
        a third portion of spare space providing redundancy to the first RAID 6 array;
    wherein a first cumulative amount of used space storing the user data in the first RAID 6 array includes each of the first portion of used space storing the user data of the first number of disk drives;
    wherein a second cumulative amount of unused space available for storing the user data in the first RAID 6 array includes each of the second portion of unused space available for storing the user data of the first number of disk drives;
    wherein a third cumulative amount of spare space providing redundancy to the first RAID 6 array in the first RAID 6 array includes each of the third portion of spare space providing redundancy to the first RAID 6 array of the first number of disk drives;

determining that the third cumulative amount of spare space falls below two disk drives selected from the first number of disk drives;

in response to determining that the third cumulative amount of spare space falls below the two disk drives selected from the first number of disk drives, determining that the second cumulative amount of unused space is greater than one disk drive selected from the first number of disk drives;

in response to determining that the second cumulative amount of unused space is greater than the one disk drive selected from the first number of disk drives, migrating the user data within each of the first number of disk drives to re-allocate locations of the second portion of unused space in each of the first number of disk drives; and in response to migrating the user data, reducing each of the second portion of unused space available for storing the user data of the first number of disk drives by a first amount and increasing each of the third portion of spare space providing redundancy to the first RAID 6 array of the first number of disk drives by the first amount, wherein the first amount is equal to the one disk drive selected from the first number of disk drives divided by the first number of disk drives.

6. The method of claim 5, further comprising:
receiving notification from the first RAID 6 array of a new maximum allowed logical block address in the form of the first RAID 6 array's previous maximum allowed logical block address less a size of the one disk drive selected from the first number of disk drives divided by the first number of disk drives.

7. The method of claim 5, further comprising:
receiving notification from the first RAID 6 array of a new array size in the form of the first RAID 6 array's previous size less a size of the one disk drive selected from the first number of disk drives divided by the first number of disk drives.

8. The method of claim 5, further comprising:
receiving notification from the first RAID 6 array of designated logical block addresses greater than a new maximum allowed logical block address being new spare space.

9. The method of claim 5, wherein the method is implemented as a service in a cloud environment.

10. A system for dynamic spare storage allocation, the system comprising:
a processor; and
a computer-readable storage medium storing program instructions which, when executed by the processor, are configured to cause the processor to perform a method comprising:
providing a storage array comprising a first redundant array of independent disks (RAID) 6 array, the first RAID 6 array having a first number of disk drives, each disk drive of the first number of disk drives having a storage space comprising:
a first portion of used space storing user data;
a second portion of unused space available for storing the user data; and
a third portion of spare space providing redundancy to the first RAID 6 array;

wherein a first cumulative amount of used space storing the user data in the first RAID 6 array includes each of the first portion of used space storing the user data of the first number of disk drives;

wherein a second cumulative amount of unused space available for storing the user data in the first RAID 6 array includes each of the second portion of unused space available for storing the user data of the first number of disk drives;

wherein a third cumulative amount of spare space providing redundancy to the first RAID 6 array in the first RAID 6 array includes each of the third portion of spare space providing redundancy to the first RAID 6 array of the first number of disk drives;

determining that the third cumulative amount of spare space falls below two disk drives selected from the first number of disk drives;

in response to determining that the third cumulative amount of spare space falls below the two disk drives selected from the first number of disk drives, determining that the second cumulative amount of unused space is greater than one disk drive selected from the first number of disk drives;

in response to determining that the second cumulative amount of unused space is greater than the one disk drive selected from the first number of disk drives, migrating the user data within each of the first number of disk drives to re-allocate locations of the second portion of unused space in each of the first number of disk drives; and in response to migrating the user data, reducing each of the second portion of unused space available for storing the user data of the first number of disk drives by a first amount and increasing each of the third portion of spare space providing redundancy to the first RAID 6 array of the first number of disk drives by the first amount, wherein the first amount is equal to the one disk drive selected from the first number of disk drives divided by the first number of disk drives.

11. The system of claim 10, the method further comprising:
receiving notification from the first RAID 6 array of a new maximum allowed logical block address in the form of the first RAID 6 array's previous maximum allowed logical block address less a size of the one disk drive selected from the first number of disk drives divided by the first number of disk drives.

12. The system of claim 10, the method further comprising:
receiving notification from the first RAID 6 array of a new array size in the form of the first RAID 6 array's previous size less a size of the one disk drive selected from the first number of disk drives divided by the first number of disk drives.

13. The system of claim 10, the method further comprising:
receiving notification from the first RAID 6 array of designated logical block addresses greater than a new maximum allowed logical block address being new spare space.

* * * * *